(12) United States Patent
Kokado et al.

(10) Patent No.: US 9,130,212 B1
(45) Date of Patent: Sep. 8, 2015

(54) POSITIVE ELECTRODE ACTIVE MATERIAL FOR NONAQUEOUS ELECTROLYTE SECONDARY BATTERIES, METHOD FOR MANUFACTURING THE SAME, AND NONAQUEOUS ELECTROLYTE SECONDARY BATTERY USING SAID POSITIVE ELECTRODE ACTIVE MATERIAL

(75) Inventors: Rei Kokado, Ehime (JP); Kensaku Mori, Ehime (JP)

(73) Assignee: Sumitomo Metal Mining Co., Ltd. (JP)

( * ) Notice: Subject to any disclaimer, the term of this patent is extended or adjusted under 35 U.S.C. 154(b) by 211 days.

(21) Appl. No.: 13/876,255

(22) PCT Filed: Sep. 30, 2011

(86) PCT No.: PCT/JP2011/072519
§ 371 (c)(1),
(2), (4) Date: Mar. 27, 2013

(87) PCT Pub. No.: WO2012/043783
PCT Pub. Date: Apr. 5, 2012

(30) Foreign Application Priority Data

Sep. 30, 2010 (JP) .................................. 2010-221587

(51) Int. Cl.
| | | |
|---|---|---|
| *B21D 43/00* | (2006.01) | |
| *H01M 4/02* | (2006.01) | |
| *H01M 4/13* | (2010.01) | |
| *H01M 4/131* | (2010.01) | |
| *H01M 4/505* | (2010.01) | |
| *H01M 4/525* | (2010.01) | |

(52) U.S. Cl.
CPC .............. *H01M 4/131* (2013.01); *H01M 4/505* (2013.01); *H01M 4/525* (2013.01)

(58) Field of Classification Search
CPC ............................ H01M 4/505; H01M 4/525
USPC ............... 429/223, 224, 231.5, 231.9, 231.95
See application file for complete search history.

(56) References Cited

U.S. PATENT DOCUMENTS

2001/0046628 A1  11/2001  Oesten et al.

FOREIGN PATENT DOCUMENTS

| JP | 11-16566 | 1/1999 |
|---|---|---|
| JP | 200-149948 | 5/2000 |
| JP | 2001-313034 | 11/2001 |
| JP | 2002-75367 | 3/2002 |
| JP | 2005-251716 | 9/2005 |
| JP | 2009-289726 | 12/2009 |
| JP | 2010-40383 | 2/2010 |

OTHER PUBLICATIONS

JP 2002-075367—Translation.*
Japanese Office Action of Mar. 29, 2012.
International Search Report of Dec. 6, 2011.

* cited by examiner

*Primary Examiner* — Ladan Mohaddes
(74) *Attorney, Agent, or Firm* — Gerald E. Hespos; Michael J. Porco; Matthew T. Hespos

(57) ABSTRACT

The present invention aims to provide a positive electrode active material for nonaqueous electrolyte secondary batteries which achieves high output and high capacity when used as a positive electrode material. Disclosed is a method for manufacturing the positive electrode active material for nonaqueous electrolyte secondary batteries, the method comprising: a first step, wherein an alkaline solution with a tungsten compound dissolved therein is added to and mixed with a lithium metal composite oxide powder represented by a general formula $Li_zNi_{1-x-y}Co_xM_yO_2$ (wherein, $0.10 \leq x \leq 0.35$, $0 \leq y \leq 0.35$, $0.97 \leq Z \leq 1.20$, and M is at least one element selected from Mn, V, Mg, Mo, Nb, Ti, and Al), including primary particles and secondary particles composed of aggregation of the primary particles, and thereby W is dispersed on a surface of the primary particles; and a second step, wherein, by heat treating the mixture of the alkaline solution with the tungsten compound dissolved therein and the lithium metal composite oxide powder, fine particles containing W and Li are formed on a surface of the primary particles.

7 Claims, 2 Drawing Sheets

POSITIVE ELECTRODE ACTIVE MATERIAL FOR NONAQUEOUS ELECTROLYTE SECONDARY BATTERIES, METHOD FOR MANUFACTURING THE SAME, AND NONAQUEOUS ELECTROLYTE SECONDARY BATTERY USING SAID POSITIVE ELECTRODE ACTIVE MATERIAL

BACKGROUND OF THE INVENTION

1. Field of the Invention

The present invention relates to a positive electrode active material for nonaqueous electrolyte secondary batteries, a method for manufacturing the same, and a nonaqueous electrolyte secondary battery using said positive electrode active material.

2. Description of the Related Art

In recent years, with the spread of portable electronic equipment, such as cell phones and notebook-sized personal computers, development of a small and lightweight nonaqueous electrolyte secondary battery having a high energy density has been strongly desired. Also, development of a high-output secondary battery as a battery for electric vehicles, such as hybrid vehicles, has been strongly desired.

As a secondary battery satisfying such demands, there is a lithium-ion secondary battery. This lithium-ion secondary battery comprises a negative electrode, a positive electrode, an electrolyte solution, and the like, and, as active materials of the negative electrode and the positive electrode, materials capable of desorption and insertion of lithium are used.

At present, research and development of such lithium-ion secondary battery are being actively conducted, and particularly, since a 4V class high voltage can be achieved by a lithium-ion secondary battery using lithium metal composite oxide having a layered or spinel structure as a positive electrode material, the commercialization thereof as a battery having a high energy density is progressing. As a material which has been mainly proposed until now, it may include lithium-cobalt composite oxide ($LiCoO_2$), which is relatively easily synthesized; lithium-nickel composite oxide ($LiNiO_2$), in which nickel, more inexpensive than cobalt, is used; lithium-nickel-cobalt-manganese composite oxide ($LiNi_{1/3}Co_{1/3}Mn_{1/3}O_2$); lithium-manganese composite oxide ($LiMn_2O_4$), in which manganese is used; and the like.

Among these, lithium-nickel composite oxide and lithium-nickel-cobalt-manganese composite oxide have been highlighted as a material having excellent cycle characteristics and providing high output with low resistance, and, in recent years, low resistance, which is necessary for achieving high output, has been regarded as important.

As a method for achieving the low resistance, addition of different elements is applied, and particularly, it is supposed that a high-valent transition metal, such as W, Mo, Nb, Ta, or Re, is useful.

For example, Japanese Patent Application Laid-Open No. 2009-289726 proposes a lithium transition metal compound powder for use as a positive electrode material for lithium secondary batteries, the lithium transition metal compound powder containing 0.1 to 5 mol % of at least one element selected from the group consisting of Mo, W, Nb, Ta, and Re, with respect to a total molar amount of Mn, Ni, and Co, and describes that an atomic ratio of a total of Mo, W, Nb, Ta, and Re to a total of metallic elements other than Li and Mo, W, Nb, Ta, Re, on the surface of primary particles, is preferably five or more times than the atomic ratio of the whole of the primary particles.

According to this proposal, there can be attempted low cost, high safety and high load characteristics, as well as improvement in powder handling, in the lithium transition metal compound powder for use as a positive electrode material for lithium secondary batteries.

However, the above-mentioned lithium transition metal compound powder is obtained in such a manner that a raw material is pulverized in a liquid medium, a slurry in which the raw material is uniformly dispersed is then sprayed and dried to be burned. Therefore, there is a problem that a part of the different element, such as Mo, W, Nb, Ta, or Re, substitutes for Ni which has been arranged in layers, whereby battery characteristics, such as battery capacity and cycle characteristics, decrease.

Japanese Patent Application Laid-Open No. 2005-251716 proposes a positive electrode active material for nonaqueous electrolyte secondary batteries which has at least lithium transition metal composite oxide having a layered structure, wherein the lithium transition metal composite oxide exists in a form of particles comprising either or both of primary particles and secondary particles composed of aggregation of the primary particles, and has, at least on the surface of the particles thereof, a compound comprising at least one selected from the group consisting of molybdenum, vanadium, tungsten, boron, and fluorine.

Thus, Japanese Patent Application Laid-Open No. 2005-251716 provides a positive electrode active material for nonaqueous electrolyte secondary batteries, which shows excellent battery characteristics even under severer environment conditions for use, and particularly, describes the improvement of initial characteristics without any improvement in thermal stability, load characteristics, and output characteristics since the positive electrode active material has, on the surface of the particles thereof, a compound comprising at least one selected from the group consisting of molybdenum, vanadium, tungsten, boron, and fluorine.

However, the effect of at least one kind of addition element selected from the group consisting of molybdenum, vanadium, tungsten, boron, and fluorine exists in improvement in initial characteristics, that is, initial discharge capacity and initial efficiency, and thus it does not refer to output characteristics. According to the disclosed manufacturing method, there is a problem that the addition element is mixed and burned with a hydroxide which has been heat-treated simultaneously with a lithium compound and a part of the addition element therefore substitutes for nickel which has been arranged in layers, whereby battery characteristics decrease.

Furthermore, Japanese Patent Application Laid-Open No. H11-16566 proposes a positive electrode active material which is coated with a metal containing at least one selected from the group consisting of Ti, Al, Sn, Bi, Cu, Si, Ga, W, Zr, B, and Mo and/or an intermetallic compound obtained by a combination of a plurality of the above mentioned elements, and/or oxide.

Japanese Patent Application Laid-Open No. H11-16566 describes that such coating enables oxygen gas to be absorbed and safety to be secured, but does not disclose output characteristics at all. Moreover, in the disclosed manufacturing method, the coating is performed using a planetary ball mill, and such coating method gives physical damages to the positive electrode active material, and causes decrease in battery characteristics.

Japanese Patent Application Laid-Open No. 2010-40383 proposes a positive electrode active material having a carbonate ion content of not more than 0.15 wt %, which is obtained in such a manner that a tungstate compound is adhered to composite oxide particles composed mainly of lithium nickelate and heat-treatment is performed.

According to this proposal, the presence of a tungstate compound or a decomposed material of a tungstate compound on a surface of the positive electrode active material allows oxidation activity on a surface of the composite oxide particles in a charge state to be controlled, whereby gas generation by decomposition of a nonaqueous electrolyte solution or the like can be controlled, however, output characteristics are not disclosed at all.

Moreover, in the disclosed manufacturing method, a solution obtained by dissolving a sulfate compound, a nitrate compound, a borate compound, or a phosphate compound in a solvent as an adhering component, together with a tungstate compound, is preferably adhered to the composite oxide particles heated beyond the boiling point of the solution with the adhering components dissolved therein, and the solvent is removed in a short time, and therefore, the tungsten compound is not fully dispersed on a surface of the composite oxide particles, and it is hard to say that the tungstate compound is uniformly adhered.

In view of such problems, the present invention aims to provide a positive electrode active material for nonaqueous electrolyte secondary batteries which achieves high output as well as high capacity when used as a positive electrode material.

SUMMARY OF THE INVENTION

In order to solve the above-mentioned problems, the inventors earnestly studied powder characteristics of lithium metal composite oxide for use as a positive electrode active material for nonaqueous electrolyte secondary batteries, and an impact thereof on positive electrode resistance of a battery, and they then found that, by forming fine particles containing W and Li on a surface of primary particles constituting a lithium metal composite oxide powder, positive electrode resistance of a battery can be reduced to improve output characteristics. Furthermore, as a manufacturing method thereof, the inventors found that, by mixing an alkaline solution containing tungsten with a lithium metal composite oxide solution and performing heat-treatment, fine particles containing W and Li can be formed on the whole surface of the primary particles, and thereby accomplished the present invention.

In particular, a first aspect of the present invention is to provide a method for manufacturing a positive electrode active material for nonaqueous electrolyte secondary batteries, the method comprising: a first step, wherein an alkaline solution with a tungsten compound dissolved therein, in which solution a tungsten concentration is 0.05 or more mol/l, is added to and mixed with a lithium metal composite oxide powder represented by a general formula $Li_zNi_{1-x-y}Co_xM_yO_2$ (wherein, $0.10 \leq x \leq 0.35$, $0 \leq y \leq 0.35$, $0.97 \leq Z \leq 1.20$, and M is at least one element selected from Mn, V, Mg, Mo, Nb, Ti, and Al), including primary particles and secondary particles composed of aggregation of the primary particles, whereby W is dispersed on a surface of the primary particles of the lithium metal composite oxide powder; and a second step, wherein, by heat treating the mixture of the alkaline solution with the tungsten compound dissolved therein and the lithium metal composite oxide powder, fine particles containing W and Li are formed on a surface of the primary particles of the lithium metal composite oxide powder.

A manufacturing method according to a second aspect of the present invention further comprises a step of water-washing the lithium metal composite oxide powder prior to the first step in the first aspect.

A third aspect of the present invention is characterized in that an amount of tungsten contained in the alkaline solution with the tungsten compound dissolved therein according to the first and second aspects is 0.1 to 3.0 atom % with respect to a total number of atoms of Ni, Co, and M, which are contained in the lithium metal composite oxide powder to be mixed with the alkaline solution.

A fourth aspect of the present invention is characterized in that the alkaline solution with the tungsten compound dissolved therein according to the first to third aspects is obtained by dissolving a tungsten compound in a lithium hydroxide solution.

A fifth aspect of the present invention is characterized in the mix of the alkaline solution with the tungsten compound dissolved therein and the lithium metal composite oxide powder according to the first to fourth aspects is mixed under conditions that the alkaline solution is in liquid form and a temperature is not more than 50° C.

A sixth aspect of the present invention is characterized in that the heat treatment in the second step according to the first to fifth aspects is performed at 100 to 600° C. in an oxygen atmosphere or a vacuum atmosphere.

A seventh aspect of the present invention is characterized in that the positive electrode active material for nonaqueous electrolyte secondary batteries is formed by a lithium metal composite oxide represented by a general formula $Li_zNi_{1-x-y}Co_xM_yO_2$ (wherein, $0.10 \leq x \leq 0.35$, $0 \leq y \leq 0.35$, $0.97 \leq Z \leq 1.20$, and M is at least one element selected from Mn, V, Mg, Mo, Nb, Ti, and Al) and including primary particles and secondary particles composed of aggregation of the primary particles, the primary particles having fine particles containing W and Li on a surface of the lithium metal composite oxide on which surface W has been dispersed by being added to and mixed with an alkaline solution having a tungsten concentration of 0.05 or more mol/l.

A eighth aspect of the present invention is characterized in that an amount of tungsten contained in the fine particles according to the seventh aspect is 0.1 to 3.0 atom % with respect to a total number of atoms of Ni, Co, and M, which are contained in the lithium metal composite oxide powder.

A ninth aspect of the present invention is characterized in that W and Li in the fine particles according to the seventh and eighth aspects exist in a form of lithium tungstate.

A tenth aspect of the present invention is characterized in that a nonaqueous electrolyte secondary battery has a positive electrode including any one of the positive electrode active materials according to the seventh to ninth aspects.

The present invention makes it possible to obtain a positive electrode active material for nonaqueous electrolyte secondary batteries which achieves high output and high capacity when the positive electrode active material is used as a positive electrode material for batteries.

Furthermore, a manufacturing method thereof is easy and suitable for manufacturing on an industrial scale, and accordingly has a great industrial value.

DETAILED DESCRIPTION OF THE DRAWINGS

Figure 1:
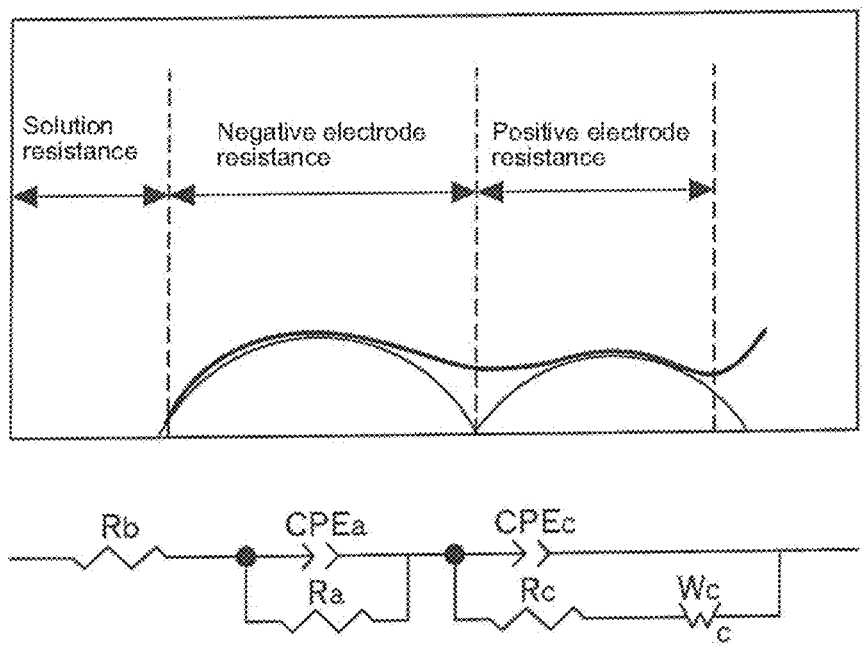
FIG. 1 is a schematic explanatory diagram showing a measurement example of impedance evaluation and an equivalent circuit used for analysis.

Hereinafter, as for the present invention, a positive electrode active material of the present invention will be explained first, and then, a manufacturing method thereof and a nonaqueous electrolyte secondary battery which uses the positive electrode active material according to the present invention will be explained.

(1) Positive Electrode Active Material

A positive electrode active material for nonaqueous electrolyte secondary batteries of the present invention comprises fine particles containing W and Li on a surface of a lithium metal composite oxide powder represented by a general formula $Li_zNi_{1-x-y}Co_xM_yO_2$ (wherein, $0.10 \leq x \leq 0.35$, $0 \leq y \leq 0.35$, $0.97 \leq Z \leq 1.20$, and M is at least one element selected from Mn, V, Mg, Mo, Nb, Ti, and Al), including primary particles and secondary particles composed of aggregation of the primary particles; and, as a further aspect, comprises fine particles containing W and Li on a surface of the primary particles of the lithium metal composite oxide powder.

As a base material, the present invention uses lithium metal composite oxide represented by a general formula $Li_zNi_{1-x-y}Co_xM_yO_2$ (wherein, $0.10 \leq x \leq 0.35$, $0 \leq y \leq 0.35$, $0.97 \leq Z \leq 1.20$, and M is at least one element selected from Mn, V, Mg, Mo, Nb, Ti, and Al), whereby high charge-and-discharge capacity is obtained. Furthermore, fine particles containing W and Li and being formed on a surface of the powder composed of lithium metal composite oxide enables the charge-and-discharge capacity to be maintained while enables output characteristics to be improved.

Generally, when a surface of a positive electrode active material is completely coated with a different kind of compound, movement of lithium ions (intercalation) is greatly restricted, and, as a result, an advantage of high capacity which lithium-nickel composite oxide has is canceled.

On the other hand, in the present invention, fine particles containing W and Li are formed on a surface of a lithium metal composite oxide powder, and the fine particles have high lithium-ion conductivity and are effective in promoting movement of lithium ions. Thus, by forming the above-mentioned fine particles on a surface of the lithium metal composite oxide powder, a conduction path of Li is formed at an interface with an electrolyte solution, whereby reaction resistance of an active material is reduced to improve output characteristics.

Here, when a surface of a positive electrode active material is coated with a layered material, regardless of the coating thickness, a specific surface area decreases, and therefore, even if the coated material has a high lithium ion conductivity, a contact area with an electrolyte solution is smaller, whereby decrease in charge-and-discharge capacity and increase in reaction resistance are easily caused. However, the formation of the fine particles according to the present invention allows a contact area with an electrolyte solution to be made sufficient to effectively improve lithium ion conductivity, and therefore, decrease in charge-and-discharge capacity can be prevented, and also increase in reaction resistance can be reduced.

Such fine particles preferably have a particle diameter of 1 to 100 nm.

The reason for this is that fine particles with a particle diameter of less than 1 nm sometimes do not have sufficient lithium-ion conductivity. On the other hand, when a particle diameter of the fine particles is more than 100 nm, sometimes coating by particles is unevenly formed, and reduction effect of reaction resistance is not sufficiently achieved.

Furthermore, since the contact with an electrolyte solution takes place on a surface of the primary particles, it is important that the fine particles are formed on the surface of the primary particles. Here, the surface of the primary particles in the present invention includes a surface of primary particles which is exposed at an external surface of second particles, and a surfaces of the primary particles exposed in a surface vicinity of and in an internal void of the second particles, wherein an electrolyte solution is capable of permeating via an exterior of the secondary particles. Furthermore, even a particle boundary between the primary particles is included if binding of the primary particles is imperfect so that an electrolyte solution is capable of permeating.

This contact with an electrolyte solution takes place not only on the external surface of the secondary particles composed of aggregation of the primary particles, but also in the surface vicinity of and in the internal void of the above-mentioned second particles, and furthermore takes place in the above-mentioned imperfect particle boundary, and therefore it is necessary to form fine particles also on the surface of the above-mentioned primary particles and to promote movement of lithium ions. Thus, by forming the fine particles on the whole surface of the primary particles, reaction resistance of lithium metal composite oxide particles can be further reduced.

Here, the fine particles need not be formed on the whole surface of the primary particles, and may be interspersed thereon. Even in the state of the interspersion, when the fine particles are formed on the surface of the primary particles which are exposed to the outer surfaces and the internal void of the lithium metal composite oxide particles, reduction effect in reaction resistance is achieved.

Properties of the surface of the lithium metal composite oxide powder can be determined, for example, by observing with a field emission scanning electron microscope, and it has been confirmed that, in a positive electrode active material for nonaqueous electrolyte secondary batteries of the present invention, fine particles containing W and Li are formed on a surface of powder made of lithium metal composite oxide.

On the other hand, in the case where the fine particles are unevenly formed between lithium metal composite oxide powders, movement of lithium ions between the lithium metal composite oxide powders is uneven, and therefore, load is applied to a specific lithium metal composite oxide powder, and thereby deterioration in cycle characteristics and increase in reaction resistance tend to be easily caused. Hence, it is preferable that the fine particles are uniformly formed even between the lithium metal composite oxide powders.

The fine particles of the present invention only have to contain W and Li, but, W and Li are preferably contained in a form of lithium tungstate. Such a formation of lithium tungstate allows lithium ion conductivity to further increase and reduction effect in reaction resistance to be further improved.

An amount of tungsten contained in the fine particles is preferably 0.1 to 3.0 atom % with respect to a total number of atoms of Ni, Co, and M, which are contained in lithium metal composite oxide. This makes it possible to achieve both high charge-and-discharge capacity and output characteristics.

When an amount of tungsten is less than 0.1 atom %, sometimes an improvement effect of output characteristics may be insufficiently obtained. On the other hand, when an amount of tungsten is more than 3.0 atom %, sometimes, too many of the above-mentioned particles are formed, whereby lithium conductivity of lithium metal composite oxide and an electrolyte solution is inhibited, and a charge-and-discharge capacity may thus decrease.

An amount of lithium contained in the fine particles is not particularly limited, and, when the fine particles contain lithium, an improvement effect of lithium ion conductivity is obtained. Usually, excess lithium exists on a surface of lithium metal composite oxide, and at the time of mixing with an alkaline solution, an amount of lithium which is supplied to fine particles by the excess lithium may be enough, but an amount of lithium enough to form a lithium tungstate is preferable.

An amount of lithium in the whole of a positive electrode active material is preferably such that a "Li/M" ratio of a number of atoms of Li to a total number (M) of atoms of Ni, Co, and Mo in the positive electrode active material is 0.95 to 1.30. When the Li/M ratio is less than 0.95, reaction resistance of a positive electrode in a nonaqueous electrolyte secondary battery using the obtained positive electrode active material increases, this leads to a decrease of a battery output. On the other hand, when the Li/M ratio is more than 1.30, initial discharge capacity of the positive electrode active material decreases, and also reaction resistance of a positive electrode increases.

The positive electrode active material of the present invention is improved in output characteristics by the formation of fine particles containing W and Li on the surface of primary particles of lithium metal composite oxide, and there is no problem if powder characteristics such as particle diameter and tap density as a positive electrode active material is within a range of a positive electrode active material which is usually used.

An effect obtained by adhering fine particles containing W and Li to a surface of primary particles of a lithium metal composite oxide powder is applicable, for example, to powders of lithium-cobalt composite oxide, lithium-manganese composite oxide, lithium-nickel-cobalt-manganese composite oxide, and the like; and furthermore, to a positive electrode active material for lithium secondary batteries which is generally used as well as the positive electrode active material mentioned in the present invention.

(2) Method for Manufacturing Positive Electrode Active Material

Hereinafter, a method for manufacturing a positive electrode active material for nonaqueous electrolyte secondary batteries in the present invention will be explained in detail for every step.

[First Step]

A first step is a step wherein an alkaline solution with a tungsten compound dissolved therein (hereinafter, an alkaline solution in which a tungsten compound is dissolved is referred to as an alkaline solution (W)) is added to and mixed with a lithium metal composite oxide powder comprising primary particles and secondary particles composed of aggregation of the primary particles. This step allows W to be dispersed on a surface of the primary particles of lithium metal composite oxide powder, the surface capable of coming into contact with an electrolyte solution. When a solid tungsten compound is mixed, dispersion is not sufficient, and in addition, when a tungsten compound not containing Li is used, Li is not eluted from lithium metal composite oxide powder, and the obtained fine particles do not contain Li, and tungsten oxide is sometimes formed.

In the first step, a tungsten compound is firstly dissolved in an alkaline solution.

A dissolution method may be an ordinary dissolution method for powder, for example, while a solution is stirred using a reaction vessel having a stirring apparatus, a tungsten compound may be added and dissolved. From a viewpoint of uniformity of dispersion, it is preferable that a tungsten compound is completely dissolved in an alkaline solution.

A tungsten compound capable of being dissolved in an alkaline solution may be used, and it is preferable to use a tungsten compound capable of being easily dissolved in alkali, such as tungsten oxide, lithium tungstate, or ammonium tungstate.

An amount of tungsten to be dissolved in an alkaline solution is preferably 0.1 to 3.0 atom % with respect to a total number of atoms of Ni, Co, and M, which are contained in lithium metal composite oxide to be mixed. Furthermore, in the manufacturing method of the present invention, since solid-liquid separation is not performed after mixing with an alkaline solution, a whole amount of tungsten in an alkaline solution (W) is distributed and adhere to a surface of primary particles of lithium metal composite oxide, and is therefore only necessary to be an amount sufficient to form the fine particles on the surface of the primary particles. However, when a lithium metal composite oxide powder is pulverized after heat treatment, fine particles containing W and Li and formed on a surface of the powder are separated, whereby a tungsten content of the obtained positive electrode active material sometimes decreases. In this case, in expectation of a decreasing amount, that is, 5 to 20 atom % with respect to an amount of tungsten to be added, an amount of tungsten to be dissolved in an alkaline solution may be determined.

A tungsten concentration in an alkaline solution (W) is preferably 0.05 to 2 mol/l. When a tungsten concentration is less than 0.05 mol/l, the tungsten concentration is low and accordingly a large amount of the alkaline solution to be mixed is required, and thus, at the time of mixing with lithium metal composite oxide, a slurry is formed. The slurring is not preferable because Li contained in a layer lattice of the lithium metal composite oxide is eluted, which causes decrease in battery characteristics. On the other hand, when a tungsten concentration exceeds 2 mol/l, an amount of the alkaline solution is small, whereby W is sometimes non-uniformly dispersed on a surface of the above-mentioned primary particles.

An alkali used for the alkaline solution is used an ordinary alkaline solution which does not contain impurities harmful to a positive electrode active material in order to obtain high charge-and-discharge capacity. Ammonia and lithium hydroxide having no risk of impurity contamination may be used, but lithium hydroxide is preferably used from a viewpoint that intercalation of Li is not inhibited. In the case where lithium hydroxide is used, an amount of lithium contained in the above-mentioned positive electrode active material after mixing needs to be within a range of the above-mentioned general formula, Li/M, and an amount of lithium hydroxide is preferably 4.5 to 15.0 at an atomic ratio with respect to W. Li is eluted from a lithium metal composite oxide to be supplied, but, using this range of lithium hydroxide, a sufficient amount of Li to form lithium tungstate can be supplied.

The alkaline solution is preferably an aqueous solution. In order to disperse W on a whole surface of the primary particles, the alkaline solution needs to permeate both a void and an imperfect particle boundary in the secondary particles. When a solvent having high volatility, such as alcohol, is used, the solvent evaporates before the alkaline solution permeates the void inside the secondary particles, and, the alkaline solution sometimes does not sufficiently permeate.

The pH of the alkaline solution only has to be a pH to dissolve a tungsten compound, and is preferably 9 to 12. When the pH is less than 9, too much amount of lithium is eluted from lithium metal composite oxide, and therefore there is a risk of deterioration in battery characteristics. On the other hand, when the pH is more than 12, too much excess alkali remains in lithium metal composite oxide, and therefore there is a risk of deterioration in battery characteristics.

In the manufacturing method according to the present invention, a composition of a positive electrode active material to be obtained indicates only a lithium portion increased by being added as an alkaline solution from the lithium metal composite oxide as a base material, and therefore, from a viewpoint of high capacity and low reaction resistance, as the lithium metal composite oxide being a base material, there is used lithium metal composite oxide represented by a well-known general formula $Li_zNi_{1-x-y}Co_xM_yO_2$ (wherein, $0.10 \leq x \leq 0.35$, $0 \leq y \leq 0.35$, $0.97 \leq Z \leq 1.20$, and M is at least one element selected from Mn, V, Mg, Mo, Nb, Ti, and Al).

In addition, since an increase in a contact area with an electrolyte solution is advantageous in improvement of output characteristics, preferably used is a lithium metal composite oxide powder which comprises primary particles and secondary particles composed of aggregation of the primary particles and has a void and a particle boundary, each capable of making an electrolyte solution permeate, in the secondary particles.

Next, a lithium metal composite oxide powder is added to and mixed with a prepared alkaline solution (W) while being stirred.

The mixing is preferably performed under conditions that the alkaline solution (W) is a liquid and a temperature is not more than 50° C. The alkaline solution (W) needs to permeate both a void and a particle boundary of the secondary particles, and needs to be a liquid. When the temperature is more than 50° C., the alkaline solution is quickly dried, and therefore there is a risk that the alkaline solution does not fully permeate the void and the particle boundary of the secondary particles. When the drying is quickly performed, elution of Li from a lithium metal composite oxide powder is not expectable, and in particularly, when Li is not contained in the alkaline solution (W), Li is not sometimes contained in the fine particles formed on the surface.

The lithium metal composite oxide powder and the alkaline solution (W) are mixed sufficiently so as to disperse W uniformly, and in the mixing, an ordinary mixer may be used. For example, by using a shaker mixer, a Lodige mixer, a *Julia* mixer, a V blender, or the like, the lithium metal composite oxide powder is sufficiently mixed with the alkaline solution (W) so that a form of the lithium metal composite oxide powder is not broken. This allows W in the alkaline solution (W) to be dispersed uniformly on a surface of the primary particles of the lithium metal composite oxide.

In the manufacturing method according to the present invention, in order to improve battery capacity and safety of the positive electrode active material, the lithium metal composite oxide powder being a base material may be further water-washed prior to the first step.

This water-washing may be performed by a well-known method and under a well-known condition, and may be performed so as to avoid deterioration of battery characteristics due to excessive elution of lithium from the lithium metal composite oxide powder. In the case where the water-washing is performed, either method may be used, a method for mixing with the alkaline solution (W) after drying, or a method for mixing with the alkaline solution (W) after only solid-liquid separation and without drying. In the case where the mixing is performed after only solid liquid separation, it is preferable that a moisture percentage after mixing with the alkaline solution (W) does not exceed a maximum moisture percentage of a mixture of dried lithium metal composite oxide powder and the alkaline solution (W), that is, a moisture percentage in the case of mixing with the alkaline solution (W) having a minimum tungsten concentration. When a moisture percentage is high, excessive lithium is eluted from the lithium metal composite oxide, and battery characteristics sometimes deteriorate.

[Second Step]

A second step is a step of heat-treating the lithium metal composite oxide powder which has been mixed with the alkaline solution (W). This step allows to form fine particles containing W and Li from W supplied from the alkaline solution (W) and the alkaline solution (W), or Li supplied by elution of lithium, and to obtain a positive electrode active material for nonaqueous electrolyte secondary batteries which has the fine particles containing W and Li on a surface of the primary particles of the lithium metal composite oxide.

The heat-treatment method is not particularly limited, but, in order to prevent deterioration of electrical properties at the time of using as a positive electrode active material for nonaqueous electrolyte secondary batteries, the heat-treatment is preferably performed at a temperature of 100 to 600° C. in an oxygen atmosphere or a vacuum atmosphere.

When the heat treatment temperature is less than 100° C., moisture is not sufficiently evaporated, and sometimes fine particles are not sufficiently formed. On the other hand, when the heat treatment temperature is more than 600° C., the primary particles of the lithium metal composite oxide is sintered, and in addition, a part of W is solid-dissolved in a layered structure of the lithium metal composite oxide, and therefore charge-and-discharge capacity of a battery sometimes decreases.

As an atmosphere at the time of the heat treatment, an oxidizing atmosphere, such as oxygen atmosphere, or a vacuum atmosphere is preferable in order to avoid a reaction with moisture or carbonic acid in atmosphere.

The heat treatment time is not particularly limited, but is preferably 5 to 15 hours in order to sufficiently evaporate moisture in an alkaline solution and form fine particles.

(3) Nonaqueous Electrolyte Secondary Battery

A nonaqueous electrolyte secondary battery according to the present invention comprises a positive electrode, a negative electrode, a nonaqueous electrolyte solution, and so on, and is constituted by the same components as in an ordinary nonaqueous electrolyte secondary battery. Note that embodiments described below is only examples, and, based on the embodiments shown herein, the nonaqueous electrolyte secondary battery of the present invention can be realized in a form in which various changes and improvements are made based on the knowledge of a person skilled in the art. Furthermore, the use of the nonaqueous electrolyte secondary battery according to the present invention is not particularly limited.

(a) Positive Electrode

Using the above-mentioned positive electrode active material for nonaqueous electrolyte secondary batteries, a positive electrode used in a nonaqueous electrolyte secondary battery is produced, for example, as follows.

First, a positive electrode active material in powder form, an electric conductive material, and a binding agent are mixed, and furthermore, activated carbon and a solvent for a purpose such as viscosity adjustment are added as needed, and these are kneaded to produce a positive electrode mixture paste.

A mixing ratio of each component in the positive electrode mixture paste is also an important factor to determine performance of a nonaqueous electrolyte secondary battery. When a total mass of a solid content in the positive electrode mixture except the solvent is taken as 100 parts by mass, it is preferable that, as is the case with a positive electrode of an ordinary nonaqueous electrolyte secondary battery, a content of the positive electrode active material is 60 to 95 parts by mass, a content of the electric conductive material is 1 to 20 parts by mass, and a content of the binding agent is 1 to 20 parts by mass.

The obtained positive electrode mixture paste is, for example, applied to a surface of a current collector made of aluminum foil, and dried to scatter the solvent. As needed, pressurization is performed by a roll press or the like in order to increase electrode density. Thus, a sheet-like positive electrode can be produced. The sheet-like positive electrode can be, for example, cut into a suitable size in accordance with an objective battery, and used for producing a battery. Note that the manufacturing method of a positive electrode is not limited to the example, but may be another method.

In the production of the positive electrode, as an electric conductive agent, for example, graphite (natural graphite, artificial graphite, expanded graphite, or the like), or a carbon black material, such as acetylene black or Ketchen black, is usable.

The binding agent plays a role which ties active material particles, and for example, polyvinylidene fluoride (PVDF), polytetrafluoroethylene (PTFE), fluororubber, ethylene propylene diene rubber, styrene butadiene, cellulose resin, polyacrylic acid, or the like is usable as the binding agent.

Note that, as needed, the positive electrode active material, the electric conductive material, and the activated carbon are dispersed, and a solvent which dissolves the binding agent is added to the positive electrode mixture. As the solvent, specifically, an organic solvent, such as N-methyl-2-pyrrolidone, is usable. The activated carbon may be added to the positive electrode mixture in order to increase electrical double-layer capacity.

(b) Negative Electrode

For a negative electrode, there is used a material obtained in such a manner that a binding agent is mixed with metallic lithium, a lithium alloy, or the like, or a negative electrode active material capable of inclusion and desorption of lithium ions, and a suitable solvent is added thereto to make a negative electrode mixture into paste form, and the negative electrode mixture is applied to a surface of a metallic foil current collector, such as copper, and dried, and then compressed and formed as needed in order to increase electrode density.

As the negative electrode active material, for example, natural graphite, artificial graphite, an organic compound burned material, such as phenol resin, or powder of a carbon substance, such as coke, is usable. In this case, as the negative electrode binding agent, a fluorine-containing resin, such as PVDF, is usable as is the case with the positive electrode. As a solvent which disperses the active material and the binding agent, an organic solvent, such as N-methyl-2-pyrrolidone, is usable.

(c) Separator

A separator is arranged so as to be sandwiched between the positive electrode and the negative electrode. The separator serves to separate the positive electrode and the negative electrode and to maintain an electrolyte, and for the separator, a thin film made of polyethylene, polypropylene, or the like and having many minute pores may be used.

(d) Nonaqueous Electrolyte Solution

A nonaqueous electrolyte solution is obtained by dissolving lithium salt as a supporting electrolyte in an organic solvent.

As the organic solvent, there may be used one kind alone or two or more kinds mixed, selected from the group consisting of a cyclic carbonate, such as ethylene carbonate, propylene carbonate, butylene carbonate, or trifluoro propylene carbonate; a chain carbonate, such as diethyl carbonate, dimethyl carbonate, ethylmethyl carbonate, or dipropyl carbonate; an ether compound, such as tetrahydrofuran, 2-methyltetrahydrofuran, or dimethoxyethane; a sulfur compound, such as ethylmethylsulfone, or butanesultone; a phosphorus compound, such as triethyl phosphate, or trioctyl phosphate; and the like.

As the supporting electrolyte, $LiPF_6$, $LiBF_4$, $LiClO_4$, $LiAsF_6$, $LiN(CF_3SO_2)_2$ or the like, or a compound salt thereof may be used.

Furthermore, the nonaqueous electrolyte solution may contain a radical scavenger, a surface active agent, a flame retardant, and the like.

(e) Shape and Configuration of Battery

As a shape of the nonaqueous electrolyte secondary battery constituted by the positive electrode, the negative electrode, the separator, and the nonaqueous electrolyte solution according to the present invention as mentioned above, various shapes, such as a cylinder type and a laminated type, may be applied.

Even when any of the shapes is adopted, the nonaqueous electrolyte secondary battery is completed in such a manner that the positive electrode and the negative electrode are laminated via the separator to form an electrode body; the obtained electrode body is impregnated with the nonaqueous electrolyte solution; connection between a positive electrode current collector and a positive electrode terminal connected with an exterior, and between a negative electrode current collector and a negative electrode terminal connected with an exterior are established using such as a lead for current collecting; and sealing in a battery case is performed.

(f) Characteristics

A nonaqueous electrolyte secondary battery using the positive electrode active material of the present invention has high capacity and high output.

In particular, a nonaqueous electrolyte secondary battery using the positive electrode active material of the present invention obtained in the more preferable embodiment has still higher capacity and still higher output since, for example, when the positive electrode active material is used in a positive electrode of a 2032 type coin battery, a high initial discharge capacity of 165 or more mAh/g and a low positive electrode resistance are obtained. Furthermore, it can be said that the nonaqueous electrolyte secondary battery has high thermal stability and also is excellent in safety.

According to the present invention, a measuring method of the positive electrode resistance is exemplified as follows. When frequency dependency of battery reaction is measured using an alternating current impedance method, which is common as an electrochemical evaluation method, a Nyquist diagram based on solution resistance, negative electrode resistance and negative electrode capacity, and positive electrode resistance and positive electrode capacity is obtained as shown in FIG. 1.

Battery reaction in an electrode comprises a resistance component associated with charge transfer and a capacity component by an electric double layer, and, using an electric circuit, these components are represented by a parallel circuit of resistance and capacity, and the whole of a battery is represented by an equivalent circuit in which solution resistance, a parallel circuit of a negative electrode, and a parallel circuit of a positive electrode are connected in series. A fitting calculation is performed for the Nyquist diagram measured using this equivalent circuit, whereby each of resistance components and capacity components can be estimated. Positive electrode resistance is equal to a diameter of a semicircle at a side of a lower frequency wave in the obtained Nyquist diagram.

Thus, alternating current impedance measurement is performed for a positive electrode to be produced, and, for the obtained Nyquist diagram, a fitting calculation is performed using an equivalent circuit, whereby positive electrode resistance can be estimated.

EXAMPLES

For a secondary battery which has a positive electrode using the positive electrode active material obtained according to the present invention, its characteristic (initial discharge capacity, positive electrode resistance) was measured.

Hereinafter, the present invention will be specifically explained using the following Examples, but the present invention is not limited at all by these Examples.

(Manufacturing and Evaluation of Battery)

For evaluation of a positive electrode active material, a 2032 type coin battery 1 shown in FIG. 3 (hereinafter, referred to as a coin type battery) was used.

Figure 3:
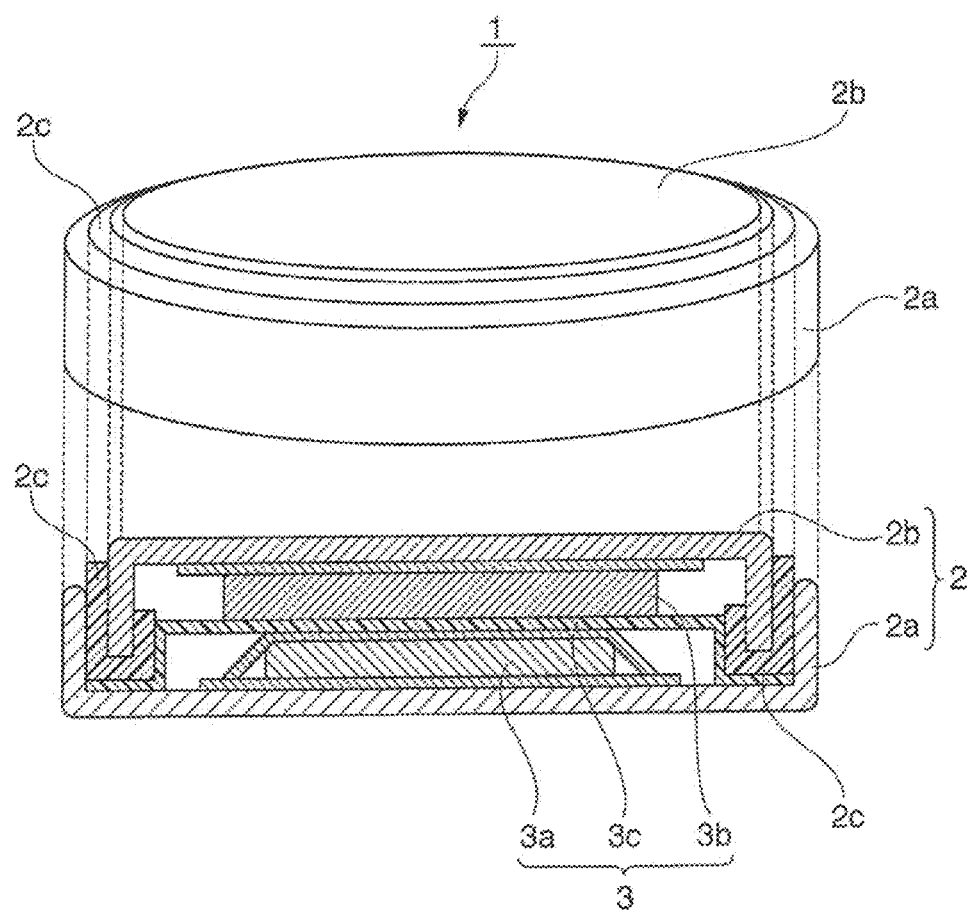
FIG. 3 shows a schematic sectional view of a coin-type battery 1 used for battery evaluation.

As shown in FIG. 3, the coin type battery 1 is constituted by a case 2 and an electrode 3 housed in the case 2.

The case 2 has a positive electrode can 2a having a hollow and an opening portion at one end, and a negative electrode can 2b arranged in the opening portion of the positive electrode can 2a; and is configured such that, when the negative electrode can 2b is arranged in the opening portion of the positive electrode can 2a, a space to house the electrode 3 between the negative electrode can 2b and the positive electrode can 2a is formed.

The electrode 3 comprises a positive electrode 3a, a separator 3c, and a negative electrode 3b, which are laminated so as to be arranged in a line in this order, and is housed in the case 2 so that the positive electrode 3a comes into contact with an inside of the positive electrode can 2a, while the negative electrode 3b comes into contact with an inside of the negative electrode can 2b.

Note that the case 2 is equipped with a gasket 2c, and the gasket 2c allows relative movement to be fixed so as to keep the positive electrode can 2a and negative electrode can 2b in a non-contact state. The gasket 2c also has a function to seal a gap between the positive electrode can 2a and the negative electrode can 2b to airtightly and fluidtightly interrupt between an interior and an exterior of the case 2.

The above-mentioned coin type battery 1 shown in FIG. 3 was manufactured as follows.

First, 52.5 mg of a positive electrode active material for nonaqueous electrolyte secondary batteries, 15 mg of acetylene black, and 7.5 mg of polytetrafluoroethylene resin (PTFE) were mixed, and press-formed at a pressure of 100 MPa to be 11 mm in diameter and 100 µm in thickness, whereby the positive electrode 3a was produced. The obtained positive electrode 3a was dried in a vacuum dryer at 120° C. for 12 hours.

Using this positive electrode 3a, the negative electrode 3b, the separator 3c, and an electrolyte solution, the above-mentioned coin type battery 1 was produced in a glove box with an Ar atmosphere in which a dew point was controlled at −80° C.

For the negative electrode 3b, there was used a negative electrode sheet which was pierced in the form of a disk having a diameter of 14 mm and in which graphite powder having an average particle diameter of approximately 20 µm and polyvinylidene fluoride were applied to a copper foil.

For the separator 3c, there was used a porous polyethylene film having a film thickness of 25 µm. For the electrolyte solution, there was used an equal volume liquid mixture of ethylene carbonate (EC) and diethyl carbonate (DEC), wherein 1 M of $LiClO_4$ is used as a supporting electrolyte (manufactured by Tomiyama Pure Chemical Industries, Limited).

Initial discharge capacity and positive electrode resistance, which show the characteristic of the manufactured coin type battery 1, were evaluated as follows.

Initial discharge capacity was evaluated in such a manner that the coin type battery 1 was left to stand for 24 hours after manufacturing thereof; after an open circuit voltage (OCV) was stabilized, with setting a current density for a positive electrode to 0.1 mA/cm$^2$, charging was performed to 4.3 V of cut-off voltage; and then, after a 1-hour suspension, discharging was performed to 3.0 V of cut-off voltage, and a capacity at the time of this discharging was regarded as initial discharge capacity.

As for positive electrode resistance, the coin type battery 1 is charged to a charging electric potential of 4.1 V, and, measurement is performed using a frequency response analyzer and a potentiogalvanostat (manufactured by Solartron, 1255B), by an alternating-current-impedance method, whereby a Nyquist plot shown in FIG. 1 is obtained. This Nyquist plot is expressed as the sum of characteristic curves showing a solution resistance, a negative electrode resistance and a capacity thereof, and a positive electrode resistance and a capacity thereof, and therefore, based on this Nyquist plot, a fitting calculation is performed using an equivalent circuit to calculate a value of the positive electrode resistance.

Note that, in the Examples, for manufacturing a composite hydroxide and producing a positive electrode active material and a secondary battery, each sample of extra-pure reagents manufactured by Wako Pure Chemical Industries, Ltd. was used.

Example 1

As a base material, there was used a lithium metal composite oxide powder which was represented as $Li_{1.060}Ni_{0.76}Co_{0.14}Al_{0.10}O_2$ and obtained by a well-known technique in which oxide powder containing Ni as a main component and lithium hydroxide were mixed and burned. The lithium metal composite oxide powder had an average particle diameter of 5.0 µm, and a specific surface area of 0.9 m$^2$/g. Note that an average particle diameter was evaluated using a volume integral average in a laser diffraction scattering method, while the specific surface area was evaluated using BET method by nitrogen gas adsorption.

To an aqueous solution obtained by dissolving 0.2 g of lithium hydroxide (LiOH) in 3 ml of pure water, 0.183 g of tungsten oxide ($WO_3$) was added and stirred, whereby an alkaline solution (W) containing tungsten was obtained. Next, the alkaline solution (W) was added to 15 g of lithium metal composite oxide powder used as a base material, and furthermore, mixing was sufficiently performed using a shaker mixer (TURBULA TypeT2C manufactured by Willy A. Bachofen (WAB)) to obtain a mixture of the alkaline solution (W) and the lithium metal composite oxide powder.

The obtained mixture was put into a burning container made of magnesia, and, in 100% oxygen flow, heat-treated for 10 hours with increasing a temperature to 500° C. at a rate of temperature increase of 2.8° C./min, and then furnace cooling was carried out to room temperature.

When a tungsten content and Li/M of the lithium metal composite oxide powder after the heat treatment were analyzed by ICP method, the tungsten content was confirmed to be 0.5 atom % composition with respect to a total number of atoms of Ni, Co, and M, and the Li/M was 1.097. Thus, it was confirmed that a compounding ratio of the mixture of the alkaline solution (W) and the lithium metal composite oxide powder was equivalent to the composition after the heat treatment.

Lastly, by putting through a sieve having a sieve opening of 38 μm and pulverizing, there was obtained a positive electrode active material having fine particles containing W and Li on a surface of the primary particles.

When a tungsten content and Li/M of the obtained positive electrode active material were analyzed by the same method as mentioned above, the tungsten content was confirmed to be 0.45 atom %, and the Li/M was 1.082. These values indicate that excess lithium separated at the time of the pulverizing was removed together with tungsten by the sieve.

[Battery Evaluation]

There were evaluated the battery characteristics of the coin type battery 1 shown in FIG. 3 and having a positive electrode produced using the obtained positive electrode active material. For positive electrode resistance, a relative value obtained by taking Example 1 as 100 was regarded as an evaluation value. Initial discharge capacity was 178.8 mAh/g, while discharge capacity after 500 cycles was 160.9 mAh/g.

Hereinafter, in Examples, a Reference Example and Comparative Example, only a material and a condition which were changed from the above-mentioned Example 1 will be described. Furthermore, Table 1 shows initial discharge capacity and evaluation values of positive electrode resistance in the Examples, Reference Example and Comparative Example.

Example 2

A positive electrode active material for nonaqueous electrolyte secondary batteries was obtained and battery characteristics were evaluated in the same manner as in Example 1, except that 0.549 g of $WO_3$ was used. Table 1 shows the results.

Example 3

A positive electrode active material for nonaqueous electrolyte secondary batteries was obtained and battery characteristics were evaluated in the same manner as in Example 1, except that 9 ml of pure water was used for preparation of the alkaline solution. Table 1 shows the results.

Example 4

A positive electrode active material for nonaqueous electrolyte secondary batteries was obtained and battery characteristics were evaluated in the same manner as in Example 1, except that the heat treatment after the mixing was performed at 140° C. for 14 hours in a vacuum atmosphere. Table 1 shows the results.

Example 5

A positive electrode active material for nonaqueous electrolyte secondary batteries was obtained and battery characteristics were evaluated in the same manner as in Example 1, except that, as a base material, there was used lithium metal composite oxide powder whose composition was represented by $Li_{1.060}Ni_{0.82}Co_{0.15}Al_{0.03}O_2$ and which has an average particle diameter of 13.2 μm and a specific surface area of 0.7 $m^2/g$. Table 1 shows the results.

Example 6

A positive electrode active material for nonaqueous electrolyte secondary batteries was obtained and battery characteristics were evaluated in the same manner as in Example 1, except that, as a base material, there was used lithium metal composite oxide powder whose composition was represented by $Li_{1.060}Ni_{0.34}Co_{0.33}Mn_{0.33}O_2$ and which has an average particle diameter of 4.1 μm and a specific surface area of 1.0 $m^2/g$. Table 1 shows the results.

Example 7

A positive electrode active material for nonaqueous electrolyte secondary batteries was obtained and battery characteristics were evaluated in the same manner as in Example 1, except that lithium tungstate ($Li_2WO_4$) was used as a tungsten compound, and a dissolved amount thereof in the alkaline solution was 0.190 g. Table 1 shows the results.

Example 8

A positive electrode active material for nonaqueous electrolyte secondary batteries was obtained and battery characteristics were evaluated in the same manner as in Example 1, except that, before mixed with the alkaline solution, a lithium metal composite oxide to be used as a base material was made into a slurry with pure water having a concentration of 1.5 g/cc and stirred for 1 minute to perform solid liquid separation, followed by vacuum-drying at 200° C. and water-washing. Table 1 shows the results.

Example 9

A positive electrode active material for nonaqueous electrolyte secondary batteries was obtained and battery characteristics were evaluated in the same manner as in Example 1, except that 1.464 g of $WO_3$ was used. Table 1 shows the results.

Reference Example 10

A positive electrode active material for nonaqueous electrolyte secondary batteries was obtained and battery characteristics were evaluated in the same manner as in Example 1, except that 18 ml of pure water was used for preparation of the alkaline solution. Table 1 shows the results.

Example 11

A positive electrode active material for nonaqueous electrolyte secondary batteries was obtained and battery characteristics were evaluated in the same manner as in Example 1, except that the heat treatment after the mixing was performed at 700° C. for 10 hours. Table 1 shows the results.

Comparative Example 1

As Comparative Example 1, the lithium metal composite oxide used as a base material in Example 1 was used without forming fine particles, and battery characteristics thereof were evaluated. Table 1 shows the results.

Conventional Example

Using the same method as in Example disclosed in Patent Literature 4, nickel sulfate, cobalt sulfate, and sodium aluminate were dissolved in water, and furthermore, while well stirring, a sodium hydroxide solution was added, whereby a coprecipitate of a nickel-cobalt-aluminum compound coprecipitated hydroxide was formed so that a molar ratio of Ni to Co to Al was Ni:Co:Al=77:20:3, and, after water-washing and drying of the coprecipitate, lithium hydroxide salt hydrate was added and adjusted so that a molar ratio was Li:(Ni+Co+Al)=105:100, whereby precursors were produced. Next, these precursors were burned at 700° C. for 10 hours in an oxygen flow, and pulverized after cooled to room temperature to produce composite oxide particles mainly containing lithium nickelate and being represented by a composition formula $Li_{1.03}Ni_{0.77}Co_{0.20}Al_{0.03}O_2$.

To 100 parts by weight of the composite oxide particles, 1.632 parts by weight of ammonium paratungstate $((NH_4)_{10}W_{12}O_{41} \cdot 5H_2O)$ was added and sufficiently mixed in a mortar to obtain a mixture, and the mixture was burned at 700° C. for 4 hours in an oxygen flow and cooled to room temperature, then taken out and pulverized to produce a positive electrode active material of Conventional Example.

There were evaluated battery characteristics of the coin type battery 1 shown in FIG. 3 and having the positive electrode produced using the obtained positive electrode active material. Table 1 shows the results.

Figure 2:
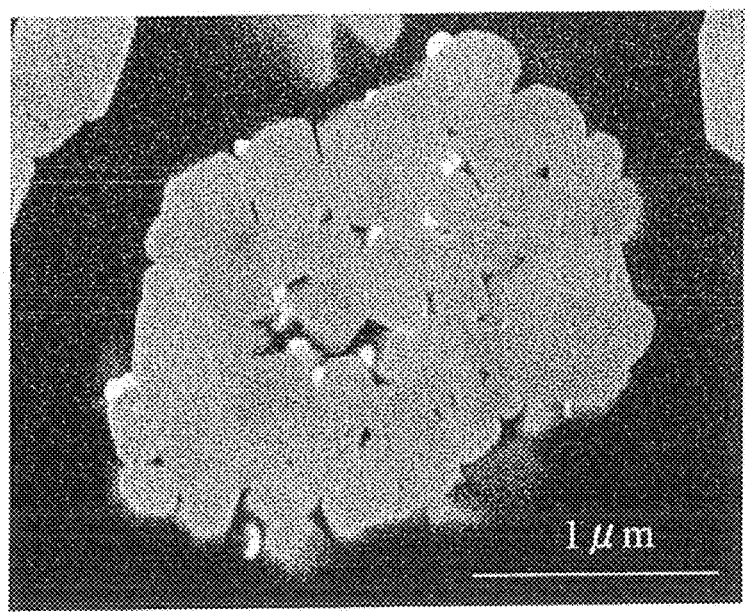
FIG. 2 shows a cross-sectional SEM photograph of lithium metal composite oxide of the present invention (at an observation magnification of 10,000×).

FIG. 2 shows an example of observation results by cross-sectional SEM of the positive electrode active material obtained in Examples of the present invention, and it was confirmed that the obtained positive electrode active material comprised primary particles and secondary particles composed of aggregation of the primary particles, and fine particles containing tungsten and lithium were formed on a surface of the primary particles.

Note that, in Example 9, wherein a higher amount of tungsten was added, excessive fine particles were formed. Therefore, initial discharge capacity and positive electrode resistance are poor compared to those of Examples 1 to 8.

In Reference Example 10, a higher amount of pure water was used for preparation of the alkaline solution, and accordingly lithium in the lithium metal composite oxide was considered to be eluted, and therefore initial discharge capacity and positive electrode resistance are poor compared to those of Examples 1 to 8.

In Example 11, the heat treatment temperature after mixing of the alkali solution (W) with the lithium metal composite oxide was high, that is, 700° C., and accordingly, tungsten was considered to be solid-dissolved in a nickel site having a layer structure in the positive electrode active material, and therefore initial discharge capacity and positive electrode resistance are poor compared to those of Examples 1 to 8.

In Comparative Example 1, since fine particles containing W and Li according to the present invention were not formed on a surface of the primary particles, positive electrode resistance is significantly high, and it is difficult to respond to a demand for high output.

TABLE 1

| | Alkaline Solution (W) | | Heat | Initial Discharge | Positive |
|---|---|---|---|---|---|
| | W amount [mol %] | W concentration [mol/l] | Treatment Condition | Capacity [mAh/g] | Electrode Resistance |
| Example 1 | 0.45 | 0.26 | 500° C. 10 hr | 178.8 | 100 |
| Example 2 | 1.38 | 0.79 | 500° C. 10 hr | 177.0 | 83 |
| Example 3 | 0.45 | 0.09 | 500° C. 10 hr | 181.1 | 105 |
| Example 4 | 0.46 | 0.26 | 140° C. 10 hr | 177.9 | 106 |
| Example 5 | 0.44 | 0.26 | 500° C. 10 hr | 190.8 | 116 |
| Example 6 | 0.46 | 0.26 | 500° C. 10 hr | 167.2 | 78 |
| Example 7 | 0.45 | 0.24 | 500° C. 10 hr | 176.3 | 98 |
| Example 8 | 0.45 | 0.26 | 500° C. 10 hr | 183.3 | 111 |
| Example 9 | 3.61 | 2.10 | 500° C. 10 hr | 159.2 | 148 |
| Reference Example 10 | 0.45 | 0.04 | 500° C. 10 hr | 152.6 | 155 |
| Example 11 | 0.45 | 0.26 | 700° C. 10 hr | 161.8 | 150 |
| Comparative Example 1 | 0.00 | — | — | 179.9 | 183 |
| Conventional Example | $Li_{1.03}Ni_{0.77}Co_{0.20}Al_{0.03}O_2$/ Ammonium Paratungstate | | | 168.8 | 170 |

As is clear from Table 1, since the compound hydroxide particles and the positive electrode active materials in Examples to 9 and 11 were manufactured in accordance with the present invention, compared with Conventional Example, they have higher initial discharge capacity and lower positive electrode resistance, and accordingly a battery having excellent characteristics is achieved. Particularly, because of the implementation under preferable conditions of an amount of tungsten added, a tungsten concentration in an alkaline solution, and a heat treatment temperature, Examples 1 to 8 shows further more excellent initial discharge capacity and positive electrode resistance, which is more suitable as a positive electrode active material for nonaqueous electrolyte secondary batteries.

In Conventional Example, since mixing with a tungsten compound in a solid state was performed, W was not sufficiently dispersed and Li was not supplied into the fine particles, and, as a result, positive electrode resistance is significantly high.

From the result above, it can be confirmed that the nonaqueous electrolyte secondary battery using the positive electrode active material according to the present invention has higher initial discharge capacity and lower positive electrode resistance, and is a battery having excellent characteristics.

The nonaqueous electrolyte secondary battery according to the present invention is suitable for power sources of small portable electronic equipment (such as notebook-sized personal computers and cell phones) in which high capacity is always required, and also suitable for batteries for electric vehicles in which high output is required.

Furthermore, the nonaqueous electrolyte secondary battery according to the present invention is excellent in safety, and capable of achieving miniaturization and high output, and therefore is suitable for a power source for electric vehicles which is subject to a restriction on a loading space. Note that the present invention may be applied not only to a power source for electric vehicles driven purely with electric energy, but also to a power source for what is called hybrid cars in which a combustion engine, such as a gasoline engine or a diesel engine, is used in combination.

The invention claimed is:

1. A method for manufacturing a positive electrode active material for nonaqueous electrolyte secondary batteries, the method comprising:
    a first step, wherein an alkaline solution with a tungsten compound dissolved therein, in which solution a tungsten concentration is 0.05 or more mol/l, is added to and mixed with a lithium metal composite oxide powder represented by a general formula $Li_zNi_{1-x-y}Co_xM_yO_2$ (wherein, $0.10 \leq x \leq 0.35$, $0 \leq y \leq 0.35$, $0.97 \leq Z \leq 1.20$, and M is at least one element selected from Mn, V, Mg, Mo, Nb, Ti, and Al), including primary particles and secondary particles composed of aggregation of the primary particles, and thereby, W is dispersed on a surface of the primary particles of the lithium metal composite oxide powder; and
    a second step, wherein, by heat treating the mixture of the alkaline solution with the tungsten compound dissolved therein and the lithium metal composite oxide powder, fine particles containing W and Li are formed on a surface of the primary particles of the lithium metal composite oxide powder.

2. The method for manufacturing the positive electrode active material for nonaqueous electrolyte secondary batteries according to claim 1, the method further comprising a step of water-washing the lithium metal composite oxide powder prior to the first step.

3. The method for manufacturing the positive electrode active material for nonaqueous electrolyte secondary batteries according to claim 1, wherein
    an amount of tungsten contained in the alkaline solution with the tungsten compound dissolved therein is 0.1 to 3.0 atom % with respect to a total number of atoms of Ni, Co, and M, which are contained in the lithium metal composite oxide powder to be mixed.

4. The method for manufacturing the positive electrode active material for nonaqueous electrolyte secondary batteries according to claim 1, wherein
    the alkaline solution is obtained by dissolving a tungsten compound in a lithium hydroxide solution.

5. The method for manufacturing the positive electrode active material for nonaqueous electrolyte secondary batteries according to claim 1, wherein
    the mix of the alkaline solution with the tungsten compound dissolved therein and the lithium metal composite oxide powder is performed under conditions that the alkaline solution with the tungsten compound dissolved therein is in liquid form and a temperature is not more than 50° C.

6. The method for manufacturing the positive electrode active material for nonaqueous electrolyte secondary batteries according to claim 1, wherein
    the heat treatment in the second step is performed at 100 to 600° C. in an oxygen atmosphere or a vacuum atmosphere.

7. The method for manufacturing the positive electrode active material for nonaqueous electrolyte secondary batteries according to claim 2, wherein
    an amount of tungsten contained in the alkaline solution with the tungsten compound dissolved therein is 0.1 to 3.0 atom % with respect to a total number of atoms of Ni, Co, and M, which are contained in the lithium metal composite oxide powder to be mixed.

* * * * *

UNITED STATES PATENT AND TRADEMARK OFFICE
CERTIFICATE OF CORRECTION

PATENT NO. : 9,130,212 B1
APPLICATION NO. : 13/876255
DATED : September 8, 2015
INVENTOR(S) : Kokado et al.

It is certified that error appears in the above-identified patent and that said Letters Patent is hereby corrected as shown below:

On The Title Page, Assignee should read

--(73) Assignee: Sumitomo Metal Mining Co., Ltd.--.

Signed and Sealed this
Twenty-third Day of February, 2016

Michelle K. Lee
*Director of the United States Patent and Trademark Office*